United States Patent [19]

Shimaoka et al.

[11] Patent Number: 5,195,155
[45] Date of Patent: Mar. 16, 1993

[54] OPTICAL COUPLING APPARATUS AND MANUFACTURING METHOD OF THE SAME, AND LENS HOLDER

[75] Inventors: Makoto Shimaoka, Ushiku; Tetsuo Kumazawa; Yasutoshi Yagiu, both of Ibaraki; Atsushi Sasayama, Komoro, all of Japan

[73] Assignee: Hitachi, Ltd., Tokyo, Japan

[21] Appl. No.: 525,675

[22] Filed: May 21, 1990

[30] Foreign Application Priority Data

May 24, 1989 [JP] Japan .................................. 1-128855
Sep. 13, 1989 [JP] Japan .................................. 1-235671

[51] Int. Cl.$^5$ ............................................. G02B 6/42
[52] U.S. Cl. ...................................... 385/90; 385/88; 385/33
[58] Field of Search .................... 356/245, 252, 257; 350/96.17, 96.18, 96.19; 385/31, 33, 88, 90

[56] References Cited

U.S. PATENT DOCUMENTS

| | | | |
|---|---|---|---|
| 3,826,998 | 7/1974 | Kindl et al. | 372/107 |
| 3,963,323 | 6/1976 | Arnold | 385/54 X |
| 4,803,689 | 2/1989 | Shibanuma | 385/49 X |
| 4,886,337 | 12/1989 | Raagaard et al. | 350/96.18 |
| 4,893,890 | 1/1990 | Lutes | 350/96.18 |
| 4,962,990 | 10/1990 | Matsuzawa et al. | 350/96.18 |
| 4,997,243 | 3/1991 | Aiki et al. | 385/92 |

*Primary Examiner*—John D. Lee
*Assistant Examiner*—S. W. Barns
*Attorney, Agent, or Firm*—Antonelli, Terrry, Stout & Kraus

[57] ABSTRACT

An optical coupling apparatus including a light emitting diode, a lens, an optical isolator and an optical fiber disposed on a common optical axis is improved in the optical coupling efficiency. The individual optical elements are roughly adjusted in the respective positions and fixed, and then a precise and fine adjustment is effectuated by plastically deforming a portion of a holder for supporting the lens or the optical isolator and/or by adjusting inclination of the holder. The holder imparted with the fine adjustment capability can be implemented as a lens holder.

2 Claims, 12 Drawing Sheets

OPTICAL COUPLING APPARATUS AND MANUFACTURING METHOD OF THE SAME, AND LENS HOLDER

BACKGROUND OF THE INVENTION

1. Field of the Invention

The present invention generally relates to an optical coupling apparatus (or optical coupler) and a method of manufacturing the same, a light emitting diode package and a method of assembling the same and a lens holder. More particularly, the invention is concerned with a light emitting diode/receiver apparatus as well as constituent parts thereof employed in optical communication systems, optical recording apparatus, optical measurements and others.

2. Description of the Prior Art

In the light emitting diode/receiver apparatus incorporating a microlense, the latter microlense is fixedly secured on a block by using a resin or is hermetically mounted on a cap, as is disclosed in JP-A-61-20911 (Japanese Patent Application Laid-Open No. 20911/1986), JP-A-61-134709 and JP-A-63-19609. However, a disadvantage the known light emitting diode/receiver apparatus resides in the face that, upon mounting the lens, the optical axes of the light emitting element and the lenses are changed or misaligned due to inaccurate positioning of the lens mounting block. Moreover, there is a nonuniformity in the layer thickness of the resin, contraction of the resin due to curing.

Further, the cap is secured along the periphery thereof by a laser welding or soldering with a view to avoiding the use of resin which is likely to provide a source for contamination. However, this type bonding frequently resulting in positional misalignment because of the necessary hardening process.

Thus, it has been extremely difficult to optically align the positions of the light emitting element, for example a laser element, and an associated lens in accordance with predetermined design specifications.

In the design of a light emitting diode package for optical communication, accuracy required for positional alignment is in a range of a few $\mu$m in the direction perpendicular to the optical axis. Upon occurrence of misalignment in the lens position, the optical axis of the lens is inclined relative to a predetermined or aimed optical axis, resulting in light rays, emitted by a light emitting element such as a semiconductor laser diode, being incident on the lens with inclination, whereby the quantity or amount of light introduced into the optical fiber is significantly reduced. In the above-described construction, when the lens is fixedly mounted on a rigid mount or within a lens case, the lens is rigidly secured, making it impractical to correct or compensate for the misalignment of the optical axis which may take place upon bonding.

When a lens is to be mounted in opposition to a laser element, the laser element is first fixed in a package. Subsequently, the lens is secured at a predetermined distance from the laser element. The accuracy required in aligning the optical axes of both elements (that is the light emitting element and the lens), is in the submicron range. For fixation by bonding, a resin, solder or the like may be employed. When the lens is fixed or secured in position by using this type of bonding material, deformation in a submicron range is likely to take place due to contraction upon curing or setting, thermal deformation or the like, and such deformation can not be neglected. The deformation necessarily resulting in misalignment of the optical axis and degradation in the optical coupling efficiency.

In the apparatuses disclosed in JP-A-61-20911 and others, a lens holder is packaged or secured to a base plate for allowing the lens position to subsequently be finely adjusted. It is however, noted that even when the lens holder is secured after positional alignment to a rigid member forming a part of the main body of the light emitting unit or apparatus, posterior positional misalignment in a submicron range will inevitably occur. Even with the structure disclosed in JP-A-63-19609 in which the lens holder is adapted to be movable along the optical axis, there is no suggestion at all as to the possibility of fine adjustment of the lens position relative to the optical axes common to the lens and the light emitting element.

As the optical coupling means to be employed in the optical coupling apparatus which incorporates an optical isolator, there is often employed a compound lens system including a plurality of lenses. In order to assure a high optical coupling efficiency in this type optical coupling apparatus, a great emphasis is placed on a method of decreasing aberrations of the lens and adjustments of the individual optical elements such as semiconductor laser diode, lenses, optical fiber and others.

A typical example of this type optical coupling package is described in a Japanese periodical "MITSUBISHI DENKI GIHOU", Vol. 62,No. 10 (1988), with. FIG. 22 of the accompanying drawing illustrating a sectional view this known optical coupling package.

Referring to the FIG. 22, a light emission element (semiconductor laser diode or LD) 61 is mounted to a chip carrier 58, and a first lens (spherical lens) 62 is fixedly disposed at the front. A thermistor 59 and a monitoring element 60, such as example a photodiode and provided with the first lens 62 being adjustable so as to be positioned in the y- and z-directions. However, the position of the first lens 62 in the x-direction is determined by the thicknesses of the thermoelectric cooler 57 and the chip carrier 58 and is not subject to positional adjustment. Light rays emitted by the light emitting diode 61, collected by the first lens 62, pass through an optical isolator 63 along the center axis thereof and are collected by a second lens 64 so as to be introduced to a single-mode optical fiber 65.

The optical isolator 63 and the second lens 64 are fixedly assembled within a cylindrical pipe or tube and can not be adjusted in the x- and y-directions. Accordingly, the coupling efficiency of the optical coupling package disclosed in the publication cited above is essentially determined by the machining precision of the individual optical elements. Assuming, by way of example, that the semiconductor laser diode and the optical fiber (single-mode optical fiber) are to be optically coupled by using two rod lenses, the alignment offset of ±2.5 $\mu$m in the x- and/or y-direction will result in typically 1 dB degradation in the coupling loss. Under these circumstances, construction permitting a final entered adjustment of the optical coupling package is required.

Although the reliable method of bonding the first lens 62 in the optical coupling package is not disclosed in the abovementioned publication, it is perceived that the first lens 62 is mounted to the chip carrier 58 by using a solder or other brazing metal. However, fixation of the first lens by using a brazing metal after adjustment of the optical axis may sometimes be accompanied by a fine positional misalignment or deviation due to contraction upon curing of the brazing metal or due to residual stress in the aging process, which is, of course, detrimental to realization of a sufficiently high optical coupling efficiency in the disclosed optical coupling package.

Additionally, in the prior techniques mentioned above, no consideration is given to the method for fine adjustment of the optical axes of the semiconductor laser, lens, optical isolator and the optical fiber. In this package design, it must again be pointed out that satisfactory or sufficient optical coupling can not be obtained with the assembly in which attention is only paid to the machining precision of the individual optical elements. Further, once the lens, one of the optical elements, is mounted to the chip carrier by using a brazing metal after adjustment of the optical axis, the portional misalignment to which the lens is fixed can not easily be modified for correcting the off-axis deviation of the lens which may be brought about due to contraction of the brazing metal occurring upon curing or setting thereof. In other words, it is impossible to readjust the optical axis of the lens and hence that of the optical coupling package.

SUMMARY OF THE INVENTION

It is a purpose of the present invention to provide a structure for a light emitting diode package and an optical coupling package which the structure permits correction of an off-axis deviation of a lens which takes place after fixation thereof.

Another object of the invention is to provide a correcting or adjusting means for restoring the optical coupling efficiency from degraded state.

In view of the above objects, in accordance with the invention, a position of a lens is first determined with reference to and in opposition to a light source such as a semiconductor laser diode which is mounted to the position. When the lens position has been determined, the lens is bonded to a holder by using a solder or brazing metal. At that time, even when the positioning or alignment of the optical axes of the light emitting diode and the lens is performed correctly in a predetermined manner, it is commonly experienced that the optimum optical coupling state has not been realized because of contraction of the brazing metal upon setting thereof or stress relied upon removal of a securing jig. In order to correct and adjust the positional deviation from the optimum optical coupling state, the holder is so implemented that it can be bent and finely deformed plastically. Thus, bending the lens holder to which the lens is bonded, elastic and plastic deformations are produced in a given portion of the lens holder. Upon removal of the bending load, the elastic deformation will disappear from the lens holder. However, the plastic deformation remains permanently. An objective of the present invention is an alignment of the optical axis which can ensure the maximum optical coupling efficiency to by making use of the plastic deformation.

According to another aspect of the invention, one end portion of a pipe to be used as a lens holder is divided into four finger-like portions which are then bent outwardly at a right angle relative to the longitudinal axis of the pipe, which is then secured at the finger-like portions to a incident light end surface of an optical isolator by a YAG-welding or resistance welding. The pipe is then welded in such position at which the center axis of the pipe substantially coincides with the optical axis of the optical isolator. A lens is inserted from the other end of the pipe to be fixedly placed therein by using a solder or glass material of a low melting point or by fitting the pipe end portion. When the lens is assembled in this manner, it is expected that off-axis deviation occurs may more or less between the optical axes of the optical isolator and the lens. In that case, an external force is applied to the pipe to thereby induce a plastic deformation in the pipe at a portion thereof which is located in the vicinity of the joint between the pipe and the optical isolator to thereby perform the axis adjustment.

According to a further aspect of the invention, the optical coupling apparatus is so assembled that light emitted from a light emitting element such as a semiconductor laser diode passes through the optical isolator attached with the first lens mentioned above to be subsequently focused by a second lens into an optical fiber. Upon assembly, the light emitting element is positionally adjusted and fixed so that the optical axis thereof is positioned at the center optical axis of the optical isolator attached with the first lens. Next, by driving the light emitting element, the position of the first lens is aligned so that light leaves the optical isolator along the center axis thereof. The light is then collected by a second lens, which is fixed relative to the optical isolator and the optical fiber after positional alignment of the end face of the optical fiber has been performed in the x-, y- and/or z-direction(s). The semiconductor laser diode typifying the light emitting element should preferably be assembled on a thermoelectric element (cooler element) with a view to stabilizing the optical output as well as oscillation wavelength of the laser. The optical isolator attached with the first lens is fixedly assembled to a side wall of a case by YAG-welding or Ag-brazing. Thus, an automatic axis alignment may be performed by holding the first lens holder pipe at a peripheral portion thereof by using a mount. In this case, only the portion of the pipe located adjacent to the joint between the pipe and the optical isolator undergoes plastic deformation with other portion remaining static.

In the following, structures describing the present invention will be described. In conjunction with the terminology used herein, it should be mentioned that the phrase "light emitting diode package" means a structure or assembly including no optical fiber and with the phrase "optical coupling package", it is intended to mean an apparatus composed of a light emitting diode package and an optical fiber.

Light emitting diode package

The present invention is directed to the light emitting diode package which can be implemented in any one of the modes or structures mentioned below.

(1) A lens holder serving as a member for holding a lens while ensuring an optical path extending through the lens has a lens mounted at one end portion thereof and is assembled to a rigid member at a plurality of locations thereof which are distanced from the position at which the lens is mounted so that the optical axis of the lens can be adjusted about a fulcrum defined by each of the positions at which the lens holder is joined to the rigid member. The lens holder is disposed together with a light emitting element on the optical path common to both of the lens and the light emitting element and then mounted on a chip carrier on which the light emitting element is mounted.

(2) A lens holder serving as a member for holding a lens while ensuring an optical path extending through the lens has a lens mounted at one end portion thereof and is fixedly assembled to a rigid member at a plurality of locations distanced from the position at which the lens is mounted so that inclination of the lens relative to the optical path can be adjusted about a fulcrum defined by each of the positions at which the lens holder is joined to the rigid member. The lens holder and a light emitting element are disposed on the optical path common to both of them. The lens holder is mounted on a chip carrier on which the light emitting element is mounted.

(3) A major portion of a lens holder serving as a member for holding a lens while ensuring an optical path extending through the lens is configured in the form of a pipe, a plate or a combination thereof. A part of the major portion of the lens holder is of less rigidity than the remaining part. The lens holder and a light emission element are disposed on the optical path common to both of them. The lens holder is mounted on a chip carrier on which the light emission element is mounted.

(4) A lens holder serving as a member for holding a lens while ensuring an optical path extending through the lens has a lens mounted at one end portion thereof and is fixedly secured to a rigid member at a plurality of locations distanced from the position at which the lens is mounted so that the optical axis of the lens can be adjusted with reference to a fulcrum defined by each of the positions at which the lens holder is joined to the rigid member. The lens held by the lens holder and a light emission element disposed on the optical path of the lens are mounted on a single chip carrier which is provided with a first convex portion for securing the lens holder at a position distanced from the lens and a second convex portion at which the light emission element is fixedly mounted.

(5) A lens holder serving as a member for holding a lens while ensuring an optical path extending through the lens has a lens mounted at one end portion thereof and is fixedly secured to a rigid member at a plurality of locations distanced from the position at which the lens is mounted so that inclination of the lens relative to the optical path can be adjusted with reference to a fulcrum defined by each of the positions at which the lens holder is joined to the rigid member. The lens held by the lens holder and a light emission element disposed on the optical path of the lens are mounted on a single chip carrier which is provided with a first convex portion for securing the lens holder at a position at a predetermined distance from the lens and a second convex portion at which the light emission element is fixedly mounted.

(6) A major portion of a lens holder serving as a member for holding a lens while ensuring an optical path extending through the lens may be in the form of a pipe, a plate or a combination thereof. A part of the major portion of the lens holder is less rigid than the remaining part. The lens held by the lens holder and a light emission element disposed on the optical path of the lens are mounted on a single chip carrier which is provided with a first convex portion for securing the lens holder at a position at a predetermined distance from the lens and a second convex portion at which the light emission element is fixedly mounted.

(7) A lens holder serving as a member for holding a lens while ensuring an optical path extending through the lens has a lens mounted at one end portion thereof and is fixedly secured to a rigid member at a plurality of locations which are distanced from the position at which the lens is mounted so that the optical axis of the lens can be adjusted with reference to a fulcrum defined by each of the positions at which the lens holder is joined to the rigid member. The lens holder is secured to the rigid member by a spot welding at a plurality of mounting positions.

(8) A lens holder serving as a member for holding a lens while ensuring an optical path extending through the lens has a lens mounted at one end portion thereof and is fixedly secured to a rigid member at a plurality of locations distanced from the position at which the lens is mounted so that inclination of the lens relative to the optical path can be adjusted with reference to a fulcrum defined by each of the positions at which the lens holder is joined to the rigid member. The lens holder is joined to the rigid member by a spot welding at a plurality of mounting points.

(9) A major portion of a lens holding member serving for holding a lens while ensuring an optical path extending through the lens is in the form of a pipe, a plate or a combination thereof. A part of the major portion of the lens holder is less rigid than the remaining part. The lens holder is joined to the rigid member by spot welding at a plurality of mounting positions.

(10) The chip carrier for mounting with the lens holder is mounted on a cooler which should preferably incorporate a thermoelectric cooler element such as a Peltier element or the like.

(11) The lens holder is welded to a rigid member such as a chip carrier at a plurality of spots by resistance welding or by brazing.

Optical coupling apparatus

The present invention is also directed to optical coupling apparatus which may be realized in any one of modes or structures mentioned below.

(1) An optical coupling apparatus in which light source from a semiconductor laser diode is collimated or focused through a first lens to pass subsequently through an optical isolator, and the light leaving the optical isolator is focused through a second lens to be introduced into an optical fiber. The optical parts included in the path extending from the semiconductor laser diode to the first lens are implemented by any one of the light emitting diode package mentioned above. It is preferred that the light passed through the optical isolator and focused by the second lens to be introduced into the optical fiber should be so aligned as to be coincident with the optical axis of the optical fiber by deforming plastically a portion of the lens holder.

(2) An optical coupling apparatus comprises a semiconductor laser element fixedly assembled to a thermoelectrical cooler element through interposition of a chip carrier, an optical isolator (including a polarizer, a Faraday rotator and an analyzer arrayed sequentially on an optical axis), an optical fiber assembled in a ferrule, and lens (usually one or two lenses of which at least one serves to optically coupling the semiconductor laser diode, the optical isolator and the optical fiber sequentially to one another and which lens may be either a single element lens or a combined lens). The lens for collecting light emitted by the semiconductor laser diode is assembled by means of a lens holder to an optical coupling end surface of the optical isolator which faces toward the semiconductor laser diode. The semiconductor laser diode and the optical fiber and optically coupled to each other by deforming a portion of the lens holder or alternatively by adjusting finely inclination of the lens holder.

(3) An optical coupling apparatus comprises a semiconductor laser diode fixedly assembled to a thermoelectric cooler through the medium of an interposed chip carrier, an optical isolator including a polarizer, a Faraday rotator and an analyzer arrayed sequentially on an optical axis, an optical fiber assembled in a ferrule, and lenses for optically coupling the semiconductor laser diode, the optical isolator and the optical fiber sequentially to one another. The lens for collecting light emitted from the semiconductor laser diode is assembled to an optical coupling end surface of the optical isolator which faces toward the semiconductor laser diode to thereby optically couple the semiconductor laser diode and the optical fiber to each other.

(4) An optical coupling apparatus comprises a case, an optical isolator inserted in the case through one side wall thereof, a thermoelectric cooler mounted directly or indirectly on an inner surface of a side wall of the case differing from the abovementioned one side wall independently of a mounting portion of the optical isolator, a semiconductor laser diode mounted on the thermoelectric cooler, and a lens disposed on an optical axis interconnecting the light emitting face of the semiconductor laser diode and an optical coupling end surface of the optical isolator, wherein the lens is assembled to the optical isolator.

(5) An optical coupling apparatus comprises an optical isolator including a polarizer, a Faraday rotator and an analyzer arrayed sequentially on an optical axis, a lens bonded to one optical coupling end surface of the optical isolator by means of a lens holder so that the focal point of the lens is positioned on the optical axis, a semiconductor laser diode mounted in the vicinity of one optical coupling end of the optical isolator, and an optical fiber mounted in the vicinity of the other optical coupling end of the optical isolator and optically coupled to the latter. In this case, the lens should preferably be a spherical lens or a GRIN rod lens. In the most preferred mode, the rod lens is fixedly assembled to at least one optical coupling end surface of the optical isolator. Further, it is preferred that the lens and the optical isolator are assembled in alignment within one and the same pipe so that adjustment of the optical axis with the semiconductor laser diode and the fiber can be performed by partially deforming the pipe.

Optical module

The invention is further directed to the optical module which represents optics or optical apparatus in more general term and encompasses the optical coupling apparatus as well.

An optical module according to the invention comprises an optical element holder having mounted thereon at least an optical function element such as a lens, a fiber, a prism, a mirror and/or a switch, wherein the optical axis of the optical module is finally adjusted by deforming plastically a portion of the optical element holder.

Lens holder

The invention is also directed to the lens holder.

There is provided according to an aspect of the invention a lens holder serving as a member for holding a lens while ensuring an optical path extending through the lens. The lens holder comprises a lens mounted at one end portion thereof and is assembled to a rigid member at a plurality of locations thereof distanced from the position at which the lens is mounted so that (1) the optical axis of the lens can be adjusted with reference to a fulcrum defined by each of the positions at which the lens holder is joined to the rigid member or (2) inclination of the lens relative to the optical path can be adjusted with reference to the fulcrum. A major portion of the lens holding member may be configured in the form of a pipe, a plate or a combination thereof, wherein a part of the major portion of the lens holder is made to be of less rigidity than the remaining part.

In a preferred embodiment of the lens holder which can facilitate the adjustment of the optical axis, the holder member may be formed with notches to thereby specify the portion or location which produces the plastic deformation.

Method of manufacturing optical coupling apparatus, assembling light emitting diode package and adjusting optical axis of optical module The invention is further directed to a method of manufacturing the optical coupling apparatus, a method of assembling the light emitting diode and a method of adjusting the optical axis of the optical module.

In a mode of carrying out the optical coupling apparatus manufacturing method according to an aspect of the invention, the optical axes of a light emitting diode, at least two lens, an optical isolator and an optical fiber are roughly adjusted to one another and thereafter these optical elements are bonded to a case with the positional relationship established through the rough adjustment being maintained. Subsequently, inclination of the holder supporting one of the optical elements mentioned above is finely adjusted or alternatively a portion of the holder is deformed plastically to thereby make the optical axes of the individual optical elements coincide with one another. Thereafter, the case is welded by a cover to seal off hermetically the inside of the case. In case the holder is a lens holder for supporting a lens, it is preferred that (1) the lens holder is mounted on the chip carrier together with the light emitting diode and rough alignment of the optical axis is performed, whereon the chip carrier having the lens holder and the light emitting diode mounted thereon and roughly adjusted is placed within the case to performed precise alignment of the optical axis or (2) the lens holder is provisionally mounted on the chip carrier which is previously bonded to the case and then precise alignment of the lens axis is performed by adjusting the inclination of the lens holder or by deforming plastically a portion of the lens holder or (3) the lens holder is provisionally assembled to the optical isolator and thereafter precise alignment of the optical axis is performed by partial adjustment of the lens holder. On the other hand, when the holder is an isolator holder for supporting the optical isolator, preferrably the isolator holder is provisionally bonded to the case in such a manner as to extend through a side wall of the case and thereafter the precise optical axis alignment is performed by adjusting the inclination of the isolator holder or alternatively by plastically deforming a portion of the isolator holder.

According to a method of assembling the light emitting diode taught by the invention, a lens is bonded to a lens holder which is then provisionally assembled within a case while positioning the lens holder roughly on the optical axis of a light emitting diode, and subsequently the lens is precisely aligned with the optical axis by adjusting finely the inclination of the lens holder or alternatively by plastically deforming a portion of the lens holder. According to another assembling method of the invention, a lens is bonded to a lens holder which is then positioned roughly on the optical axis, whereon the lens holder is fixedly assembled at a portion thereof to a rigid member, and subsequently the light emitting diode is driven to thereby cause the element to emit light, while the lens holder is bent by monitoring light output from the lens in such direction that the light source is increased, to thereby align the position of the lens with the optical axis.

In a method of aligning an optical axis of an optical module according to another aspect of the invention, a group of optical elements including at least two lenses and an optical isolator are disposed on the optical axis interconnecting an optical coupling end of an optical fiber and a light emitting diode, wherein the optical elements inclusive of the lenses are first provisionally aligned with one another in respect to the optical axis, being then fixed to a package, and subsequently readjustment is performed on the lens located remotely from the optical coupling end of the optical fiber.

Optical elements (parts) and others

Preferred structures of the optical parts employed in carrying out the invention as well as preferred modes of the method of manufacturing the same are what follows.

(1) A lens may be inserted and fixed in a pipe or a through-hole formed in a plate and then the pipe or the plate may be fixed at the other end thereof adjacent to one optical coupling end surface of the optical isolator, whereon adjustment of the optical axis can be performed by deforming a portion of the pipe or the plate.

(2) For bonding the lens to the pipe or the through-hole formed in the plate, a solder or a brazing metal such as Au-Sn alloy or a sealing glass of low melting point may be used.

(3) For fixing a portion of the pipe or plate at a location adjacent to one optical coupling end surface of the optical isolator, thereby may be employed resistance welding method or YAG-welding method.

(4) The optical isolator may be accommodated within a cylindrical case, wherein a spherical lens or focusing rod lens may be bonded fluid-tightly to one optical coupling end of the optical isolator while a lens may be fixed similarly to the other optical coupling end of the optical isolator in an gas-tight manner.

(5) A semiconductor laser diode may by provided adjacent to one optical coupling end of the optical isolator with an optical fiber being provided adjacent to the other optical coupling end of the optical isolator.

(6) A lens and an optical isolator may be assembled within one and the same pipe, whereon adjustment of the optical axes of the semiconductor laser element and the optical fiber may be performed by deforming partially the pipe.

Deviation or displacement of the optical axis appearing after attachment and fixation of a lens contains three components, i.e. one in the optical axis (z) direction in which the light emitting diode and the lens are interconnected and the other components in the x- and y-directions, respectively, which are perpendicular to the optical axis. The deviation in the z-direction has a margin which is 50 to 100 times as large as that of the deviations in the x- and y-directions, since light is propagated in the direction along the optical axis. Accordingly, the positional deviation in the z-direction can sufficiently be disposed of by the initial position alignment without need for any further correction. On the other hand, the light emitting diode emits light source with a radiation angle in a range of 30° to 40° in a Gaussian distribution in which the intensity of the light beam is concentrated about the optical axis. Accordingly, deviations in the x- and y-directions which are the off-axial deviations provide important factors in lowering the light output power. Permissible range of the off-axial deviation in the x- and y-directions is±2.5 μm, at which the coupling efficiency is lowered by 1 dB, while that of deviation in the z-direction is 120 μm. Accordingly, in order to ensure a high optical coupling efficiency, there is required a structure which permits fine adjustment or correction in both the x- and y-directions.

For correcting the deviations of the optical axis in the x- and y-directions, the lens holder susceptible to bending deformation is forcibly deformed in the x- and y-directions to correct the position of the lens supported by the lens holder. Thereafter, the light emitting diode is driven and the output power of light after passage of the lens is monitored. The lens holder is bent in the x- or y-direction in which the light output power is increased by the bending. Unless the optimal position at which the light output becomes maximum can be attained through single bending, the bending deformation is repeated twice, thrice and so forth with magnitude of the deformation being adjusted. When positional deviation is produced by excessive bending deformation in the x- or y-direction, additional bending deformation is performed in the opposite direction to thereby decrease the excessive deformation. By deforming plastically the lens holder attached with the lens in this manner to thereby allow the deformation to remain permanently, it is possible to orient or dispose the lens at the position where the maximum light output can be ensured.

In a preferred mode for carrying out the invention, a pipe having a first lens affixed thereto at one end is divided at the other end portion into four finger-like members with the aid of which the pipe is fixedly welded to the optical isolator. By applying an external force to the pipe portion while supporting it, elastic deformation initially produced at the pipe region from which the fingers extend is transformed to plastic deformation, as a result of which the lens position can be moved slightly upon removal of the external force. By repeating this process, the lens can be adjusted to the position at which the maximum optical coupling efficiency can be realized.

DESCRIPTION OF THE PREFERRED EMBODIMENTS

Now, the present invention will be described in detail in conjunction with preferred or exemplary embodiments thereof by reference to the accompanying drawings.

Figure 1:
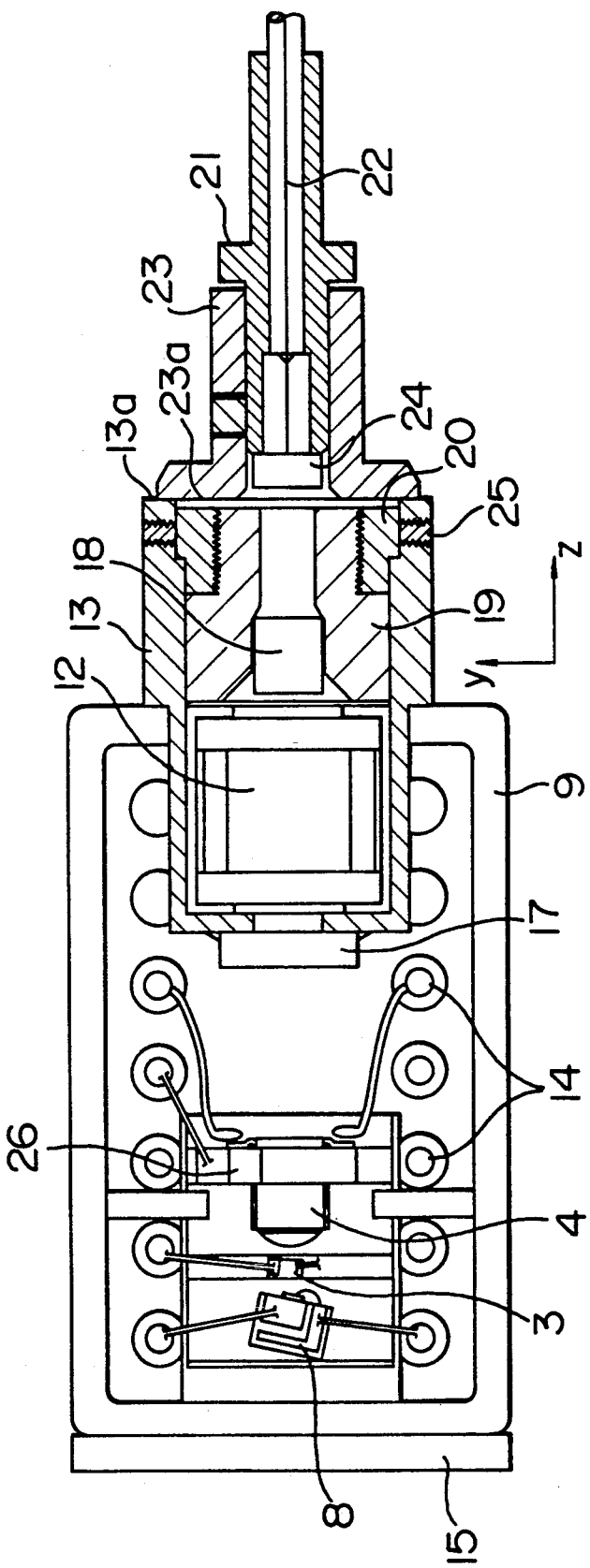
FIG. 1 is a top plan view showing, a partially in section, an optical coupling apparatus according to an embodiment of the present invention with a cover of a case being removed.
Figure 2:
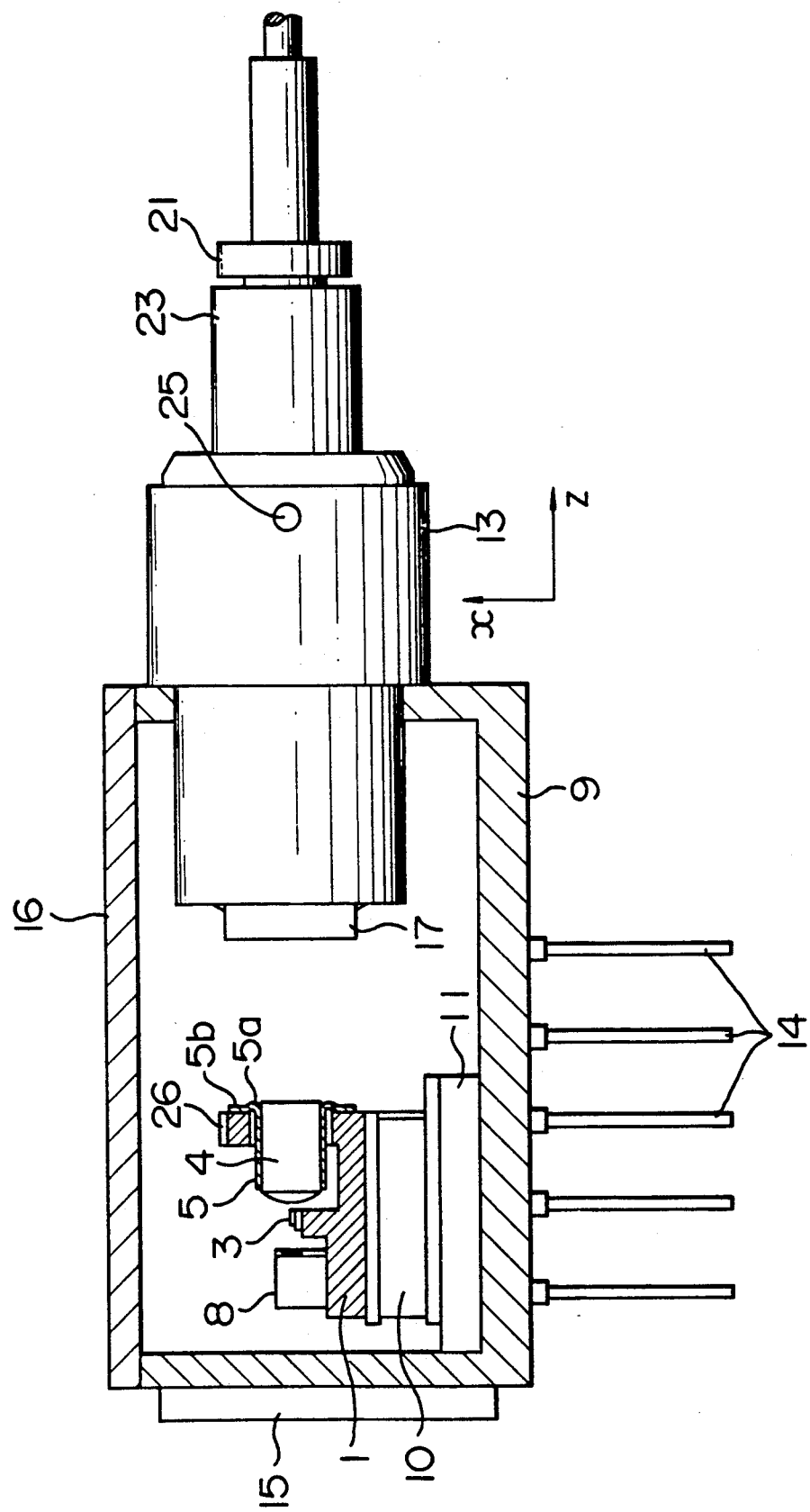
FIG. 2 is a side elevational view showing the same partially in section.

In the first place, the description will be directed to a first embodiment of the optical coupling apparatus according to the invention by reference to FIG. 1 to FIG. 4, in which FIG. 1 is a plan view showing the optical coupling apparatus with some parts shown in section, and FIG. 2 is a side elevational view showing the same partially in section.

Referring to the figures, a reference numeral 1 denotes a chip carrier having a lens holder 5 mounted thereon by a method which will be described later on. The chip carrier 1 is bonded onto a top surface of a cooler element 10 by using a solder of a low melting point, which cooler 10 in turn is previously bonded onto a clad material layer 11 deposited on a bottom wall of a case 9. The cooler 10 may be constituted by a Peltier element and is also referred to as the thermoelectric cooler or TEC in abbreviation. A numeral 2 denotes a light emitting diode which is constituted by a laser diode (LD) in the case of the instant embodiment and which is also mounted on the chip carrier 1. The chip carrier 1 carrying the light emitting diode 3 and the lens 4 is secured after having been roughly adjusted in the position such that the light emitting diode 3, the lens 4, an optical isolator 12 and an optical fiber 22 are arrayed in line with one another on and along the optical axis defined thereby.

Mounted on and extending from the bottom wall of the case 9 are lead terminals for electrically driving or monitoring the light emitting diode (LD) 3, a light receiver 8 which may be constituted by a photodiode or PD in abbreviation, the cooler and others. Although these lead pins 14 project internally of the case 9, they are omitted from FIG. 2 for the sake of clarity of illustration. It should be mentioned that the case 9 is a DIL (Dual-In-Line) type package case. A package mounting plate 15 is laterally mounted on the case 9, as can be seen in the figures. More specifically, the package mounting plate 15 has a length greater than that of one end wall of the case 9, extending in the direction perpendicular to the plane of the drawing so that it can be secured to a wall of the like of an external thermal radiators or equipment by appropriate means such as mounting screws and holes. A numeral 16 denotes a cap or cover.

A cylindrical housing 13 for accommodating therein the optical isolator 12 is fittingly mounted in the other end wall of the case 9 and fixed by brazing with silver. An end wall of the housing 13 facing toward the light emitting diode (LD) 3 is hermetically sealed by mounting a window glass sheet 17 by brazing with a sealing glass material so that fluid or gas-tightness can be maintained within the case 9. The window glass sheet 17 is applied with antireflection films over both surfaces thereof for preventing the laser beam from reflecting off the window glass.

A second lens 18 is disposed at a position downstream of the optical isolator 12 with the optical fiber 22 being disposed downstream of the lens 18, as viewed in the light transmitting direction.

A ferrule 21 for the optical fiber 22 is fixedly assembled to the case 9 by means of a ferrule guide 23. A reference numeral 19 denotes a holder for the second lens 18, a numeral 20 denotes a threaded ring, a numeral 24 denotes a glass sheet and a numeral 25 denotes a screw.

The optical coupling apparatus according to instant embodiment of the invention is assembled in a manner described below. In the first place, the light emitting diode including the chip carrier 1 having mounted thereon the lens holder 5, the light emitting diode (LD) 3 and the light receiver (PD) 8 is mounted on the cooler 10, whereon the optical axis is roughly aligned. By electrically energizing the light emitting diode (LD) 3, light emitted by the element 3 is collimated to a parallel light beam through the lens 4. The beam diameter may be of 0.8 mm. Then, the collimated laser beam having passed through the window glass 17 is observed in the state in which the optical isolator 12 and the optical fiber have been removed. Deviation of the center of a circular spot of the collimated light beam from a position of the optical axis determined previously with a distance of 1 to 2 meters from the case 9 is taken by an infrared camera and displayed on a cathode ray tube (CRT) display. By grasping the lens holder 5 by means of a chuck designed to this end, the lens holder 5 is bent in a direction perpendicular to the optical axis along which light is propagated so that the center of the circular beam spot is moved to the position which is coincident with the optical axis. As a result of this, a foot portion of the lens holder 5 remains in the plastically deformed state. In this manner, the lens position is corrected so that the deviation from the optical axis can disappear. Needless to say, unless the deviation from the optical axis is eliminated through the single bending deformation, the bending process described above may be repeated a number of times until the deviation makes disappearance. The plastic deformation can easily be realized by providing a fringe at a corner portion 5a of the lens holder, as can be seen in FIG. 2.

Subsequently, the optical isolator 12 is placed within the housing 13. By rotating the optical isolator 12, a position is searched and determined at which the intensity of the light beam exiting from the optical isolator 12 becomes maximum. Next, the lens holder 19 incorporating the second lens 18 is inserted at a position at which the trailing end of the lens holder 19 is brought into contact with the optical isolator 12, whereby the rotation of the optical isolator 12 is stopped. Then, the threaded ring 20 is clamped onto the lens holder 20.

Subsequently, the threaded ring 20 is fixedly welded to the housing 13 by YAG welding. The light beam having passed through the optical isolator is collimated and thus converged by the condenser lens 18. As the means for aligning the focal point of the lens 18 with the tip of the optical fiber 22, the ferrule 21 in which the optical fiber 22 is bonded is employed. A glass sheet 4 coated with antireflection films is bonded to the tip end of the optical fiber 22. A position at which the intensity of output light becomes maximum in the optical fiber 24 is searched and determined by finely moving the ferrule 21 relative to the ferrule guide 23 along the direction of the optical axis, whereon the ferrule guide 23 and the ferrule 21 are fixedly bonded to each other. Next, an end surface 23a of the ferrule guide 23 fixedly incorporating the ferrule 21 is placed in opposition to the end surface 13a of the housing 13 and finely moved while maintaining them in contact for searching and determining the maximum light output position, whereon the ferrule guide 23 is fixedly welded to the housing 13 by YAG welding. In this way, the positional alignment of the optical axis can be achieved, and the maximum light output power can thus be realized. In the case of the optical coupling apparatus according to this embodiment, the fine adjustment of the first lens 4 is performed utterly independent of the exterior of the case. Accordingly, there is no possibility that the first lens 4 should become misaligned in the course of the use of the optical coupling apparatus. Further, because the adjustment is performed at the position located closest to the light emission element, the aimed positional adjustment can be accomplished with less labor when compared with adjustment through the medium of other optical parts.

Figure 3:
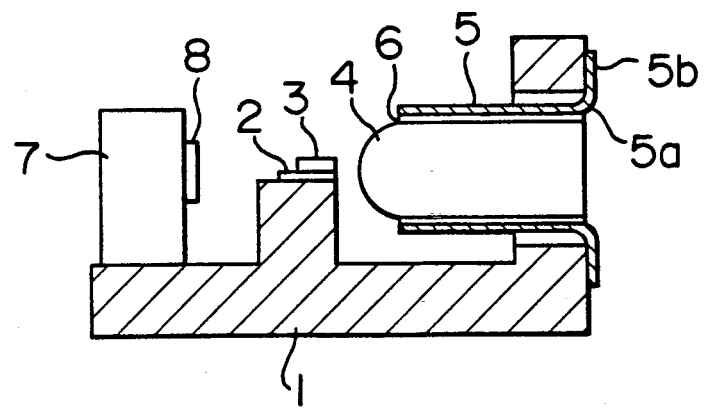
FIG. 3 is a fragmentary sectional view showing a chip carrier and a lens holder to be built in the optical coupling apparatus shown in FIG. 1.
Figure 4:
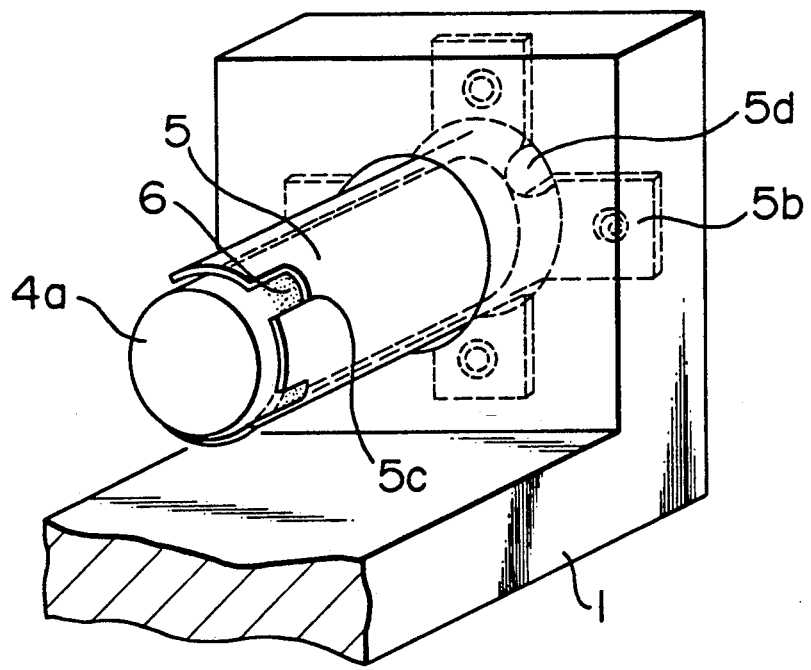
FIG. 4 is a perspective view for illustrating positional relationship between the chip carrier and the lens holder in the unit shown in FIG. 3.

Next, referring to FIGS. 3 and 4, description will be made of a light emitting diode applied to the optical coupling apparatus described above.

The chip carrier 1 serving as a base plate includes two discrete upward stages formed integrally. The light emitting diode (laser diode element or LD) 3 is mounted on the mid projection with a mount 2 being interposed therebetween. The light emitting diode 3 is fixedly bonded onto the mount 2 by soldering in such disposition that the laser source is emitted in two opposite directions (backward and forward directions) along the optical axis. The other stage is of a greater height than that of the light emitting diode mounting stage and has a hole formed therein at a center portion for mounting the lens holder 5.

More specifically, the lens holder 5 is formed of a thin-wall pipe of steel having an outer diameter of 2 mm and a thickness of 0.1 mm and so pressed as to be formed with spider-like flange finger-like portions 5b which can be brought into contact with the rear surface of the end projection. After having positionally aligned the center axis of the lens holder 5 with the light emitting position (design position) of the light emitting diode 3, the chip carrier 1 and the lens holder 5 are fixedly assembled to each other by welding the finger-like portions 5b to the rear surface of the end of a chip carrier. In the case of the illustrated embodiment, the spot welding is made at four locations, as can be seen in FIG. 4, each of which serves as a fulcrum in the fine adjustments. In other words, four fulcrums are available for the fine adjustment.

The mount 2 having the light emitting diode mounted thereon is bonded to the chip carrier 1

Subsequently, the electric Au lead wires are bonded to the light emitting diode 3 (see FIG. 1).

The lens 4 is installed at a position with a distance from the tip thereof to the light emitting diode 3, the distance being determined on the basis of the numerical aperture (NA) of the lens 4. In this conjunction, the numerical aperture is given by n.sin $\alpha$, when the angle of divergence of laser light emitted from the light emitting diode 3 toward the lens 4 is represented by $2\alpha$ with n representing the absolute index of refraction. In this state, the lens 4 is fixedly bonded to the lens holder 5 by soldering as indicated at 6.

The light receiver (PD) 8 is mounted on a mounting block 7 bonded to the chip carrier 1 at a position to be illuminated by laser light emitted in the backward direction. The light receiver 8 serves as a monitor for maintaining constant output power extracted through the optical fiber 22 by varying appropriately the electric current for driving the light emitting diode 3 in dependence on the illumination of the light emission 3. The light receiver (PD) 8 has a top surface provided with electrodes, as can be seen in FIG. 1.

Next referring to FIG. 4, the lens holder imparted with the off-axis deviation correcting function will be described. The lens holder 5 holding a rod lens 4a is provided with notches 5c. The lens 4a and the lens holder 5 are bonded together by pouring molten solder into the notches 5c. The other end portion of the lens holder 5 is integrally formed with flange fingers 5b bent at right angle in a cross-like configuration. Notches 5d are formed between the adjacent fingers 5b, respectively. The chip carrier 1 and the lens holder 5 are welded together by resistance spot welding at the fingers 5b. The chip carrier 1 and the lens holder 5 are each made of Kovar. Alternatively, the lens holder 5 may be made of soft steel. The latter has a coefficient of thermal expansion which is closer to that of the lens ($8 \times 10^{-6\circ}$ C.$^{-1}$) than Kovar. Both soft steel and Kovar belong to ferrous series and can facilitate the resistance welding.

In the foregoing, it has been assumed that the lens holder is formed in a cylindrical pipe configuration. It should however be understood that the lens holder may be formed of a pipe having a triangular, rectangular or hexagonal section. It should further be added that the pipe having an angular section such as mentioned above can easily be formed with the fingers with high working efficiency.

The structure permitting the plastic deformation and/or fine adjustment is not limited to the lens holder but can be imparted to the holder for the optical isolator or alternatively to the lens holder for the second lens disposed between the optical isolator and the optical fiber. It should however be noted that the fine adjustment of the first lens 4 can be effectuated most conveniently and positively while suppressing the off-axis deviation which may take place in the course of the use.

Next, referring to FIGS. 5 to 8, the description is next made of the principle or concept underlying the optical axis alignment according to the invention.

Figure 5:
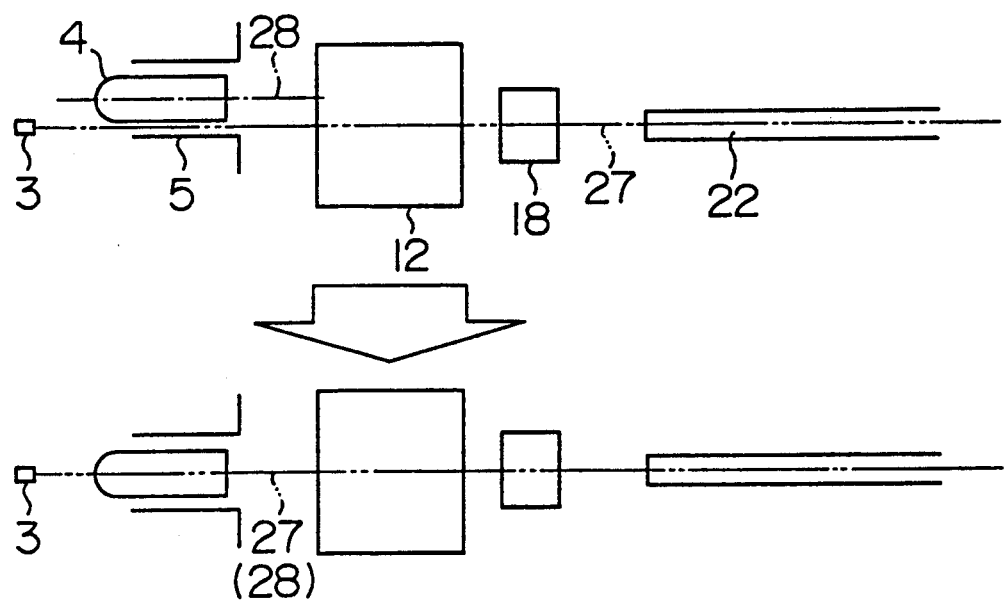
FIG. 5 is a view for illustrating the principle underlying the off-axial deviation correcting method according to the invention.

Referring to FIG. 5 which illustrates means or measures for correcting the off-axis deviation, a reference numeral 27 denotes an aimed optical axis on which all the optical parts or elements except the lens 4 are to be disposed. It is assumed that the optical axis 28 of the lens 4 is deviated from the optical axis 27 by an amount within a range of ±50 μm. In this case, the lens holder 5 is translated in parallel toward the optical axis 27, whereby the alignment of the optical axes is completed.

Figure 6:
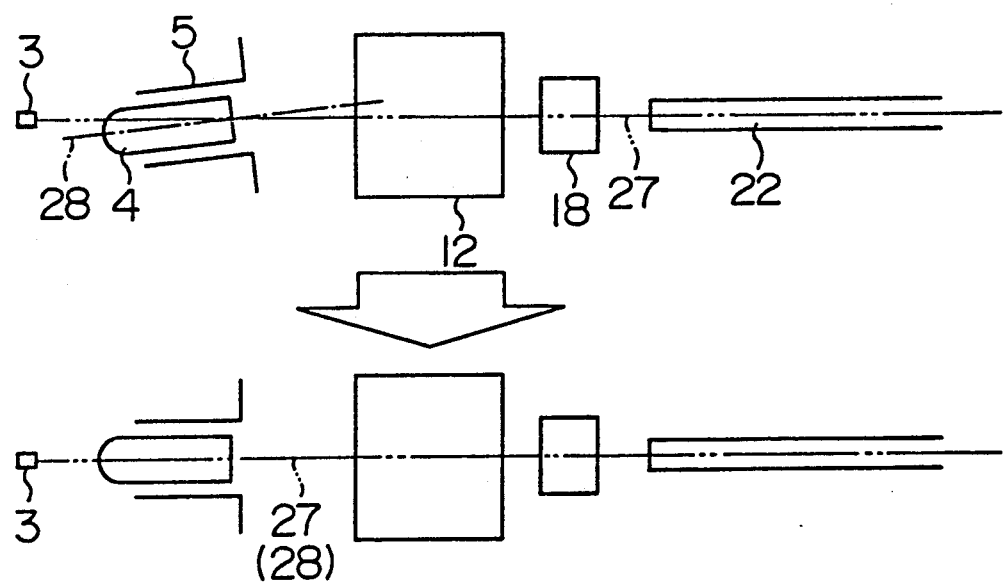
FIG. 6 is a view for illustrating the principle underlying an angular deviation correction according to the invention.

FIG. 6 is a view for illustrating means or measures for correcting an angular deviation on the assumption that definition of the optical axes are same as in the case of the off-axis deviation correction described just above. For accomplishing the alignment of the optical axes, the lens holder 5 is rotated or twisted about the spot weld serving as the fulcrum. So long as the angular deviation between the optical axes 27 and 28 lies within a range of ±4°, the alignment of the axes can be realized by this method without fail.

At any rate, there arises no fear that the spot weld might be destroyed, so far as the amount of the fine adjustment to be performed lies within the range mentioned above.

In conjunction with the welding, it is noted in general that dislocation of welded members will necessarily take place due to temperature variation in welding, asymmetry of the members to be welded and/or releaving of residual stress after welding. In the case of an optical module, such dislocation leads to loss in the optical coupling efficiency. Accordingly, capability of the fine adjustment of optical elements even after the welding according to the teachings of the invention contributes to improvement of the optical coupling efficiency and enhancement of the yield of optical modules, to great advantage.

It is self-explanatory that other optical elements or parts than the lens holder can effectively be adjusted finely in accordance with the teachings of the invention disclosed above.

In reality, however, the off-axis deviation and the angular deviation mentioned above will usually coexist. The concept for correcting such two types of deviations will now be described by reference to FIG. 7 and 8.

Figure 7:
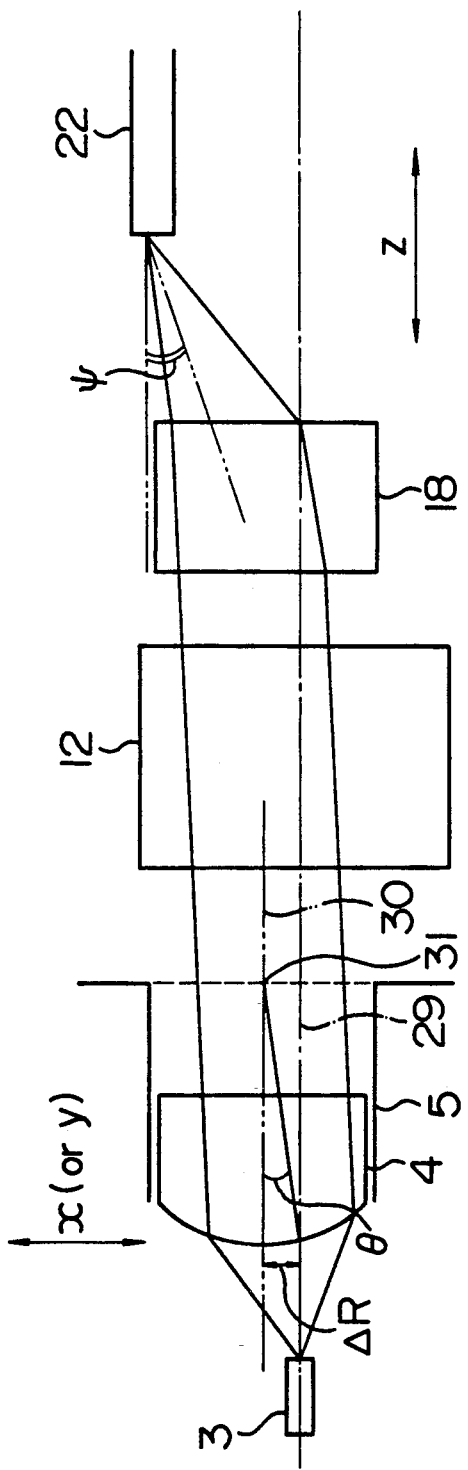
FIG. 7 is a view for illustrating the concept underlying a position aligning method according to the invention.

In the laser diode (LD) light emitting diode incorporating the optical isolator 11 serving for antireflection, light emitted by the laser diode (LD) 3 is collimated by the lens 4 and thereafter passes through the lens 18 to be focused into the optical fiber 22. Upon assembling of the light emitting diode incorporating the optical isolator 12 by aligning the optical axis 29 of the light emitting diode (LD) 3 with the optical axis 30 of the lens 4, deviations such as misalignment of the optical axes 29 and 30, relative angular displacement and/or the like will necessarily take place. Let's represent by ΔR the deviation between the optical axes 29 and 30. When the optical axis deviation ΔR exists, light having passed through the lens located downstream is incident on the optical fiber 22 with inclination of an angle ψ. As the angle ψ of inclination increases, the quantity light inputted to the optical fiber decreases rapidly. In reality, when the inclination amounts to several degrees, the quantity of light becomes substantially zero. Accordingly, in the case of the instant embodiment, correction of off-axis deviation is performed with an angle θ for the fine adjustment so that the abovementioned angle ψ becomes zero. In FIG. 7, a reference numeral 31 denotes a virtual fulcrum. In actuality, however, the spot welds of the fingers 5b of the lens holder 5 serve as the fulcrums. The virtual fulcrum 31 may be considered to be defined by the four spot welds and located at the center thereof.

In the case of the instant embodiment, the tip face of the lens 4 is moved in a plane perpendicular to the z-axis extending along the aimed optical axis. This plane is defined as the (x - y) plane. For correction of the deviation, the fine adjustment angle θ and the inclination angle ψ are individually adjusted in the x- and y-directions, respectively. More specifically, quantities θ° and ψ° are considered as existing as the vector components in the x- and y-directions, respectively. However, the actual adjustment, it is sufficient to move the lens 4 in a given one of the directions so that it is brought to the position where the maximum quantity of output light can be made available without need for moving the lens 4 in each of the x- and y-directions.

Figure 8:
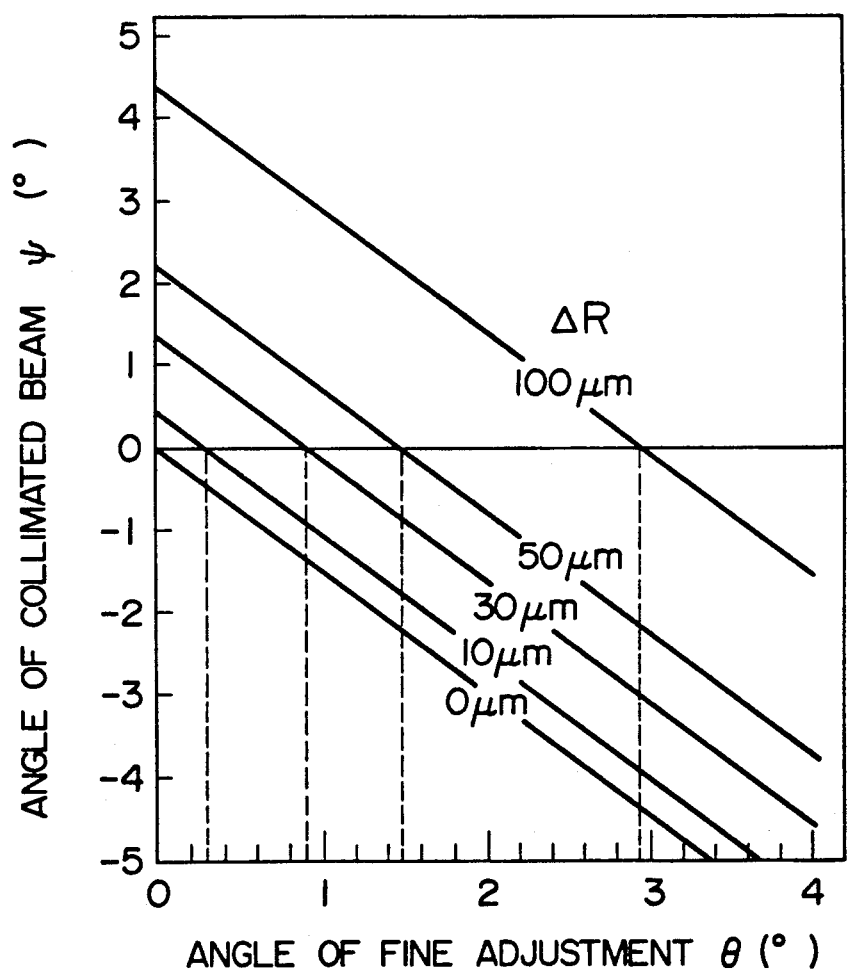
FIG. 8 is a view for illustrating graphically characteristic relations between angles of fine adjustment and angles of collimated light (parallel rays)

In the optical coupling apparatus according to the instant embodiment, it is possible to make the inclination angle ψ be zero so that the light impinges perpendicularly to the incident end surface of the optical fiber 22 for thereby assuring the maximum quantity of light which can be introduced into the fiber 22 simply by adjusting only the lens 4 positioned adjacent to the light emitting element 3. The effect of this adjusting method is apparent from FIG. 3. Referring to the figure, it is seen that when the off-axis deviation ΔR is, for example, 30 μm, then the inclination angle | is 1.3°. By moving the lens 4 in the off-axis deviation correcting direction while grasping the lens holder 5, then the inclination angle ψ is decreased along a line labeled ΔR=30 μm to reach ultimately the position where ψ=0. At that time, the lens holder 5 is inclined at an angle of 0.88° (angle θ for the fine adjustment), as can be seen in FIG. 8. By stopping deformation of the lens holder 5 at this position, light is then incident on the optical fiber 22 perpendicularly to the input end surface thereof.

In this manner, even when the off-axis deviation ΔR amounts to as large as 100 μm, incident light on the optical fiber can easily be corrected by inclining the lens 4 about 3°. In the above description, it has been assumed that the adjustment is made for correcting or canceling the off-axis deviation ΔR. It is however apparent that inclination of the lens can equally be compensated for through similar procedure by taking into account the relations illustrated in FIG. 8.

When the lens holder is bent, there makes appearance a restoration component which may then give rise to an off-axis deviation. The restoration component depends on the material of the lens holder. When the lens holder is made of a material of ferrous series, the magnitude of restoration (several percentages of bending deformation) becomes saturated within a period of 10 to 20 minutes after the bending when the lens holder is made of a material of ferrous series. Thereafter, magnitude of restoration remains invariable regardless of time lapse. Consequently, the light emitting diode of the lens holder structure according to the instant embodiment can assure a high light output.

Figure 9:
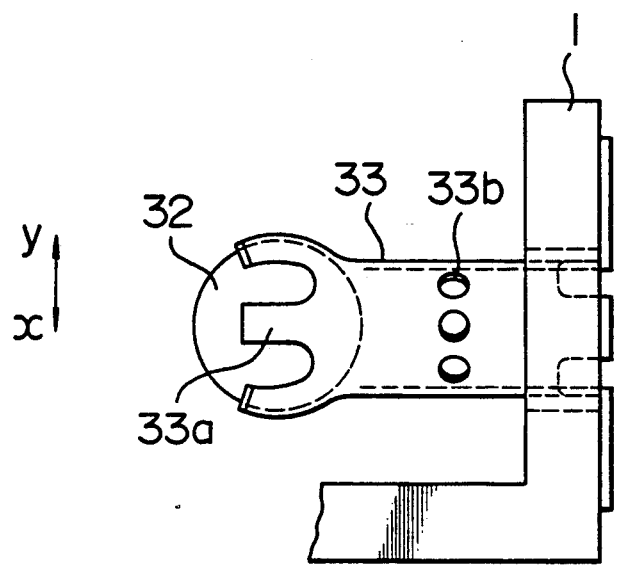
FIG. 9 is a side elevational view showing another structural configuration of a lens holder used in the optical coupling apparatus according to an embodiment of the invention.

In the case of the first embodiment described above, a rod lens is employed. FIG. 9 shows an embodiment of the invention in which a spherical lens is employed.

Referring to FIG. 9, the spherical lens 32 has a diameter of 2 mm. A lens holder 33 is made of a pipe of a soft ferrous metal and has eight circular holdes 28b each of 0.3 mm in diameter formed in a row in the circumferential diameter with an equal inter-hole distance. The pipe having an outer diameter of 2 mm and an inner diameter of 1.8 mm is formed with notches each of 0.9 mm in depth to thereby form four fingers 33a. Subsequently, the fingers 33a are bent to such extent that the distance between tips of the fingers facing each other is 1.6 mm. The spherical lens 32 is then placed by forcibly spreading the bent fingers 33a. The lens 32 thus placed is pressed inwardly to a stabilized position and fixedly bonded at that position by making use of the resiliency of the fingers 33a.

Since the diameter of the spherical lens 32 is greater than the inner diameter of the pipe 33, the former can not be inserted into the latter. Parenthetically, the other end of the lens holder 23 is welded to the chip carrier 1 in the same manner as shown in FIG. 4. The fine adjustment of the lens 32 in the (x - y) plane is performed by grasping the parallel tubular portion of the lens holder 33 and bending it in the (x - y) plane to thereby impart plastic deformation to the holed portions and the inter-hole portions.

The fine adjustment by the lens holder 33 described above can be applied to the adjustment or alignment of other micro-optical parts such as optical fiber, prism and others in addition to the adjustment of the lens.

Figure 10:
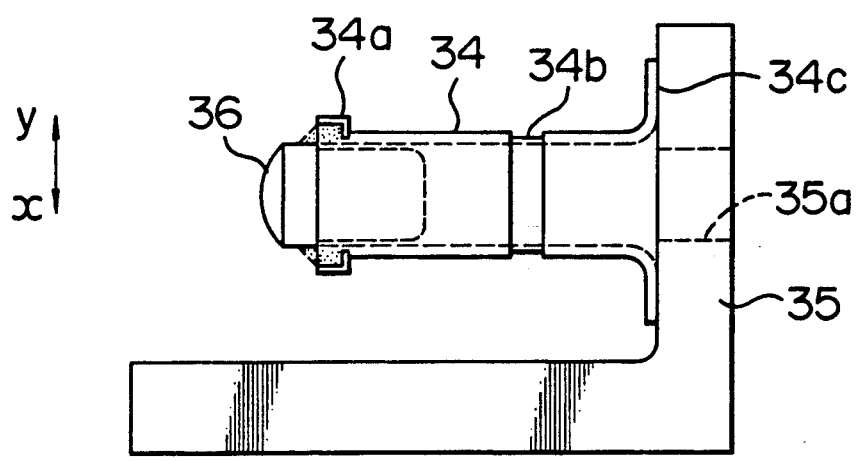
FIG. 10 shows still another embodiment of the lens holder according to the invention.

FIG. 10 shows still another embodiment of the lens holder according to the invention. Referring to the figure, the lens holder 34 is made of SUS304 and plated with nickel (Ni) for improving the wettability to molten solder. The lens holder 34 is provided with a solder pool portion 34a, a reduced portion 34b and fingers 34c. The lens holder 34 is fitted in a circular hole 35a formed in a mounting member 35 (such as that of the chip carrier 1) and secured fixedly thereto through resistance-welding of the fingers 34c. A plated rod lens 36 is placed within the lens holder 34 and secured thereto by soldering. Adjustment of the lens position is performed by grasping the lens holder 34 at the tip portion thereof and bending it in the (x - y) plane to thereby deform plastically the reduced or thinned portion 34b.

According to the embodiments of the invention described above, the tubular lens holder having the lens bonded thereto can be deformed upon application of very low bending load, as a result of which the lens position can easily be changed or adjusted by deforming the lens holder. In the course of adjusting the lens position, light output emitted by the semiconductor light emitting diode and passed through the lens being adjusted is monitored to thereby allow the lens to be so positioned or aligned that the maximum light output can be obtained. Parenthetically, the lens positioning can also be carried out by using tweezers, a pincette or the like.

By monitoring the direction in which the light beam having left the lens is propagated, inclination of the optical axis can be corrected since change of the lens position is accompanied with change in inclination of the optical axis.

In the case of the light emitting diode, when the off-axis deviation was found after the lens had once been assembled by using a bonding agent or solder, realignment of the lens position could be performed only after the bonding agent and/or solder had completely been removed. Even in that case, readjustment of the lens position or orientation could not always assure the optimal alignment of the optical axis. In this way, the prior art method of assembling the light emitting diode suffers a serious problem that the assembling efficiency is extremely low. In contrast, according to the teachings of the invention illustrated in the illustrated embodiments, correction or corrective adjustment of the lens position for canceling out the off-axis deviation can be performed even after the light emitting diode has been assembled, whereby the assembling efficiency can be improved surprisingly.

In the case of the embodiments described above, the lens holder of ferrous metal susceptible to the fine adjustment is mounted on the chip carrier 1. However, the invention is never restricted to such structure. The lens holder can also be mounted on the optical isolator or a light coupling surface of the housing 13 for the optical isolator, as will be described below.

Figure 11:
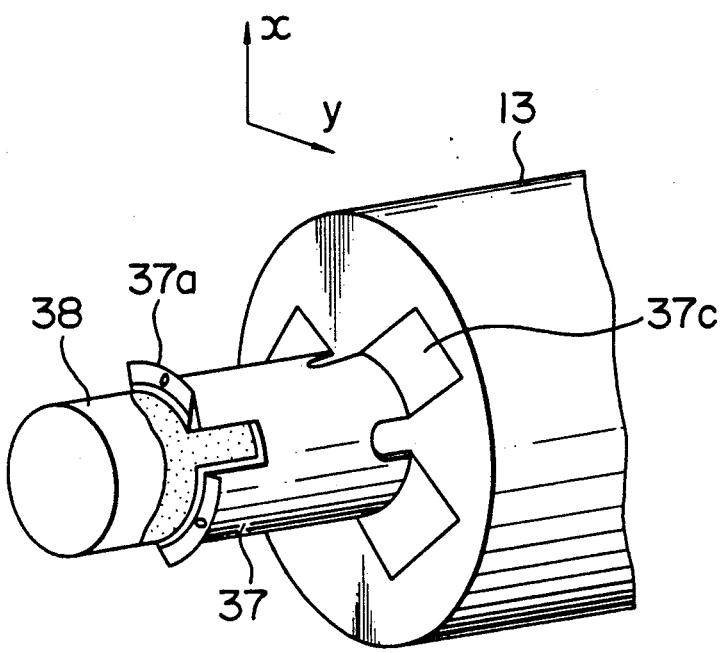
FIGS. 11, 12, 13, 14 and 15 are perspective views showing, respectively, main portions of lens holder mounting structures in the optical coupling apparatus according to other embodiments of the invention, respectively.
Figure 12:
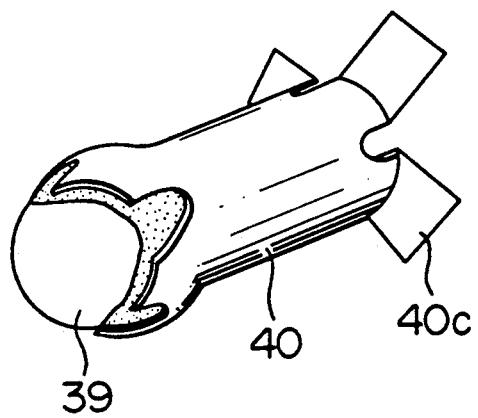
Figure 13:
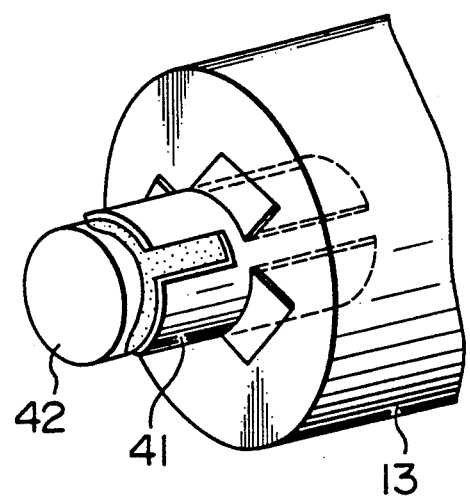
Figure 14:
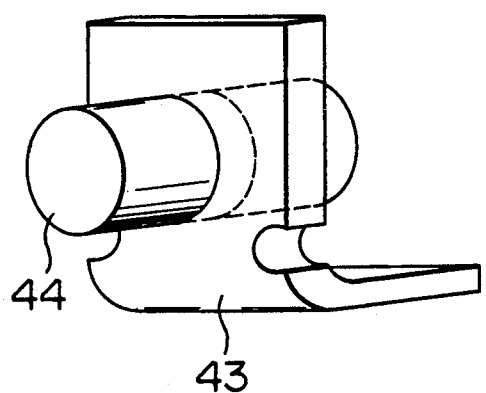

According to a practical method of adjusting the lens position in the x-direction, the lens holder is first deformed to determine the lens position at which the maximum light output can be obtained. Subsequently, after a load slightly heavier than that required for the deformation is applied, the load is completely removed from the lens holder. In this state, the light output is checked and decision is made as to whether or not the light output is maximum. Unless the light output is maximum, a load is applied again to repeat the above procedure. After the adjustment in the x-direction, adjustment is performed similarly in the y-direction for enhancing the coupling efficiency. As the means for aiding in adjusting the position of the lens holder 37 having the lens 38 fitted therein, there may be provided in the lens holder 37 holes in the circumferential direction, guide members or projections 37a (refer to FIG. 11). By providing these projections 37a, it becomes possible to impart externally deformation to the lens holder 37 and adjust the optical axis. In FIG. 11, reference symbol 37c denotes fingers through the medium of which the lens holder is welded to the end surface of the housing 13 by resistance welding.

Figure 15:
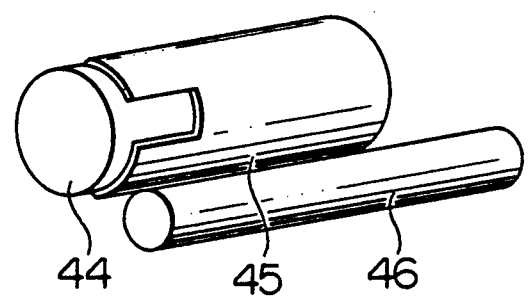

As the lens holder 37, there may be conceived many other structures such as those shown in FIGS. 12, 13, 14 and 15 in addition to those described hereinbefore. More specifically, in the structure shown in FIG. 12, a spherical lens 39 is bonded to a lens holder 40. A reference numeral 40c denotes fingers. In the case of the structure shown in FIG. 13, a rod lens 42 is bonded to a lens holder 41, which is then fixedly welded to the optical isolator housing 13 in the state in which the lens holder 41 extends partially into the interior of the housing 13. In the structure shown in FIG. 14, the tubular lens holder is replaced by a plate bent in L-like section, wherein an upstanding leg plate 43 is formed with a hole in which a lens 44 is secured. FIG. 15 shows still another structure in which a lens holder 45 having a lens 44 inserted therein is combined with a rod 46. In the structures shown in FIGS. 14 and 15, adjustment of the optical axis is realized by deforming plastically the plate or the rod.

Another embodiment of the optical coupling apparatus according to the invention will be described by reference to FIGS. 16 to 19. In the case of the instant embodiment, the rigid member to which the lens holder is fixedly welded is constituted by a part of the housing for accommodating the optical isolator.

Figure 16:
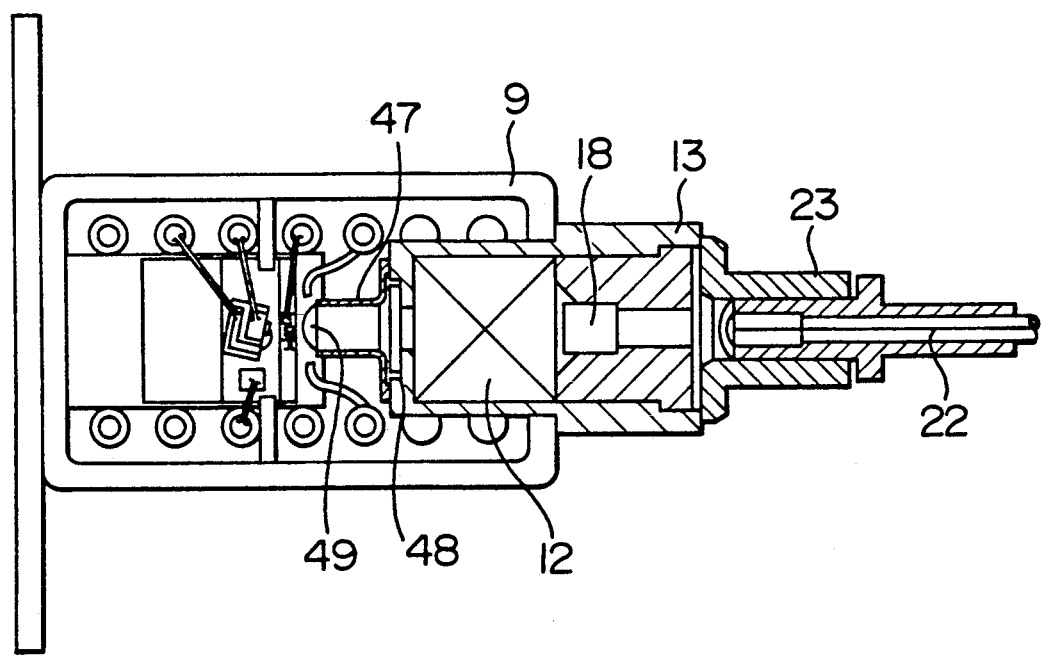
FIG. 16 is a top plan view showing an optical coupling apparatus according to a further embodiment of the invention with a cover of the case being removed.
Figure 17:
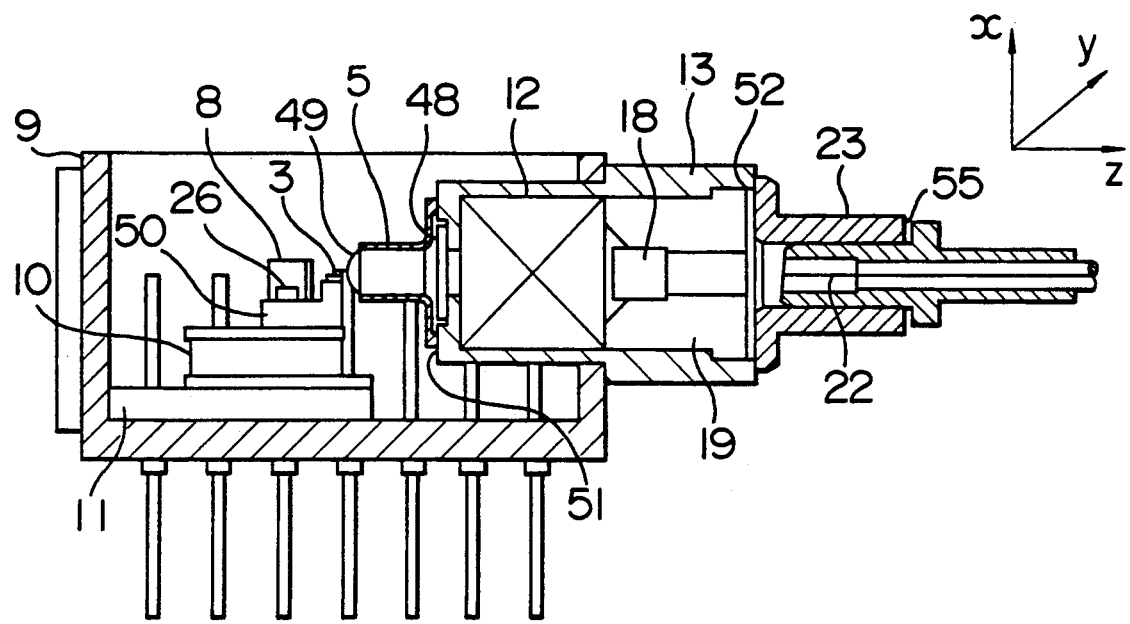
FIG. 17 is a side elevational view of the optical coupling apparatus shown in FIG. 16.

FIG. 16 is a top plan view showing the optical coupling apparatus according to the instant embodiment with a Kovar of the case being removed. FIG. 17 is a side elevational view of the same.

The light emitting diode 3 emits light in two opposite directions (forward and backward directions), respectively. By monitoring light in one of the directions by means of a light receiver such as a photodiode 8, the light output power in the other direction can be stabilized. A semiconductor laser diode employed as the light emitting element is sensitive to change in temperature, whereby light output or power, wavelength of light and threshold current undergo changes in dependence on the temperature. By way of example, in a semiconductor laser of 1.3 $\mu$m band, increasing of temperature of the laser by 10° C. is attended with a shift of the wavelength from 1.301 $\mu$m to 1.305 $\mu$m. With a view to preventing the temperature-depending wavelength change, a cooler 10 constituted by Peltier element (thermoelectric cooler) is interposed between the light emitting element 3 and a clad material 11 deposited on the bottom of the case 9.

In juxtaposition with the light emitting diode 3, a thermistor 26 is fixedly mounted for the purpose of maintaining constant the temperature of the light emitting diode 3 (semiconductor laser) by controlling the current of the cooler 10 so that resistance of the thermistor 26 can always remain constant.

Heat collected by the cooler 10 should preferably be dissipated externally of the case 9 as rapidly as possible. To this end, a Cu-W layer exhibiting a high thermal conductivity or a clad layer 11 (a laminate of Cu-layers and interposed Inver layer or the like and having a high thermal conductivity and a linear expansion coefficient approximating to that of the cooler 10) is provided underneath the cooler 10. One and the same chip carrier 50 is used for mounting thereon the light emitting diode 3, the light receiver 8 such as a photodiode and the thermistor. As a material for the chip carrier, Kovar is preferred because of its linear expansion coefficient approximating to that of the cooler 10.

The light beam emitted from the light emitting diode 3 and a radiation of 30° in the horizontal direction and radiates over 40° in the vertical direction. In order to introduce the light beam into the optical isolator 12 or the single-mode optical fiber 22 with high efficiency, a condenser lens is required. In particular, the region in which the optical isolator 12 can block the reflected light effectively is a cylindrical region extending around the optical axis and having a diameter of 1 mm and a length of 6 mm. In order to allow the light to pass through this region, it is desirable to use a first lens 49 which may be constituted by a spherical lens or a rod lens. In the case of the instant embodiment, a rod lens is used and provided with a fine adjustment structure so that the laser rays can be transmitted through the abovementioned effective region of the optical isolator, as described below.

In FIGS. 16 and 17, a reference numeral 5 denotes a lens holder for the first lens 49, a numeral 48 denotes a glass plate which is disposed immediately after the lens holder 47, a numeral 18 denotes a second lens, a numeral 19 denotes a second lens holder, a numeral 13 denotes a housing for accommodating the optical isolator 12, and a numeral 23 denotes a ferrule guide. Further, a numeral 51 denotes a weld formed by resistance welding, while 52 denotes a weld formed by YAG-welding.

Figure 18:
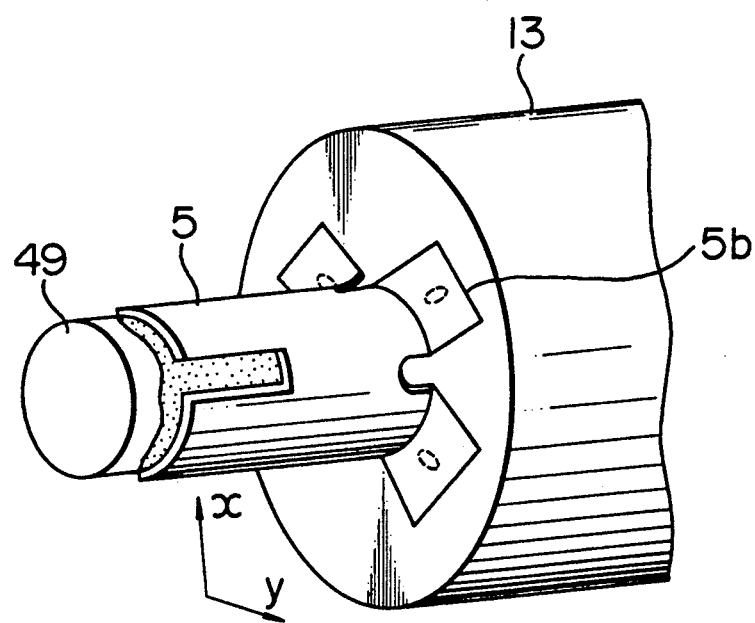
FIG. 18 is an enlarged perspective view for illustrating an internal major portion of the optical coupling apparatus shown in FIG. 16.

FIG. 18 is a view for illustrating a manner in which the first lens or rod lens 49 is fixedly bonded to a light input end surface of the housing 13 for the optical isolator 12. The rod lens 49 is fixedly soldered to the lens holder 5 made of iron or an iron-50 nickel alloy by using a solder or an Au-Sn brazing metal.

On the other hand, one end portion of the lens holder 5 is divided into four fingers 5b which are welded spot-weld to the associated end surface of the housing 13 for the optical isolator 13 by resistance welding or YAG-welding. When the cylindrical surface of the lens holder 5 is pushed in the x-direction, starting from the state illustrated in FIG. 18, those portions of the lens holder 5 located in the vicinity of the welds undergo plastic deformation, making thus it possible to realize the positional adjustment or alignment in the vertical direction. The alignment in the y-direction may be performed through similar procedure.

Figure 19:
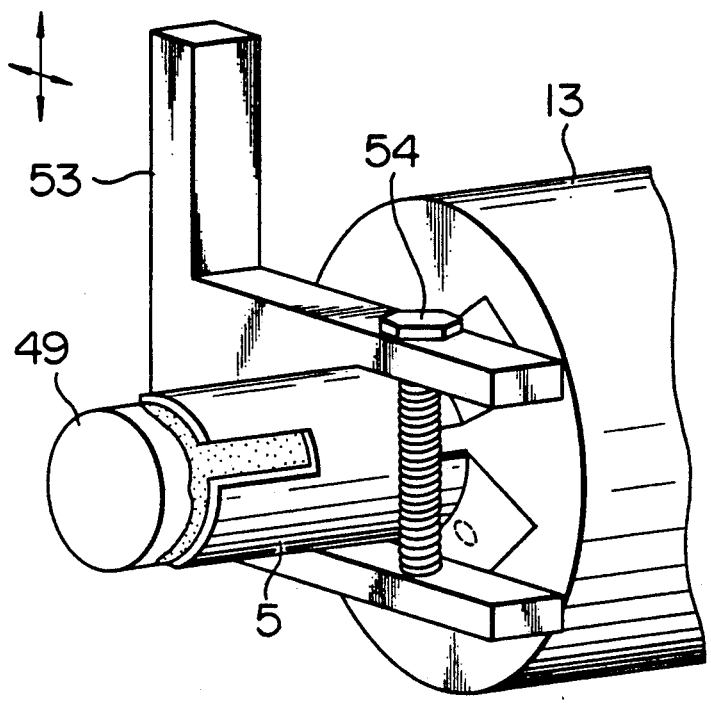
FIG. 19 is a perspective view for illustrating a method of adjusting the lens holder of the apparatus shown in FIG. 18.

For automatic adjustment of the lens holder 5, there may be conceived such a method as illustrated in FIG. 19. Referring to the figure, an adjusting mount 53 of a substantially inverted C-like configuration is mounted in contact with the outer periphery of the lens holder 5. Subsequently, the mount 53 is fixedly holded to the lens holder 5 by clamping together free end portions of bifurcated legs of the mount by means of a screw bolt 54. By applying a load onto the lens holder 5, elastic deformation first takes place in the lens holder 5, being accompanied with change in the lens position. By increasing the load, the elastic deformation progresses to plastic deformation of the lens holder 5 with the lens position changing correspondingly. In this state, the lens can no more be restored to the original or starting position with deformation of the lens holder 5 remaining as it is, even after the load has been removed. In this manner, the lens position can be adjusted by applying to the lens holder 5 the load of such magnitude that plastic deformation of the lens holder 5 is brought about.

The light having been transmitted through the optical isolator 12 is condensed by the second lens 18 and impinges on the opposite end surface of the single-mode optical fiber 22. For maintaining gas-tightness in the interior of the case 9, the glass plate 48 is bonded to the input end surface of the optical isolator 12 by using a sealing glass of low melting point. Both surfaces of the glass plate 18 are coated with antireflection films for suppressing reflection. The second lens holder 19 having the optical isolator 12 and the second lens 18 bonded thereto is subsequently inserted into the housing 13 formed of a cylindrical pipe and then fixed thereto by YAG-welding at four or more locations. The cylindrical pipe is slightly longer than the assembly of the optical isolator 12 and the second lens holder, whereby an offset portion makes appearance. The cylindrical pipe is bonded by welding at the offset portion. The ferrule guide 23 is so designed and disposed that the light beam focused by the second condenser lens 18 can be coupled to the single-mode optical fiber 22 with as high efficiency as possible. More specifically, the single-mode optical fiber 22 is inserted into the ferrule guide 23 and adjusted in respect to the position in the z-direction, whereon YAG-welding or brazing is performed along the overall circumferential joint 55 or at least at four points therealong. Thereafter, the opposite end faces of the cylindrical pipe housing 13 and the ferrule guide 23 are moved slidingly relative to each other to adjust their positions in the x- and y-direction. Subsequently, the housing 13 and the ferrule 23 are fixedly welded together by YAG welding or brazing.

In the optical coupling apparatus described above, any optical deviation occurring between the light emitting diode 3 and the first lens 49 in the x- and/or y-directions in the course of assembling or due to aging and attended with degradation in the coupling efficiency can easily be corrected or compensated for through the adjustment by deforming the lens holder 5.

Figure 20:
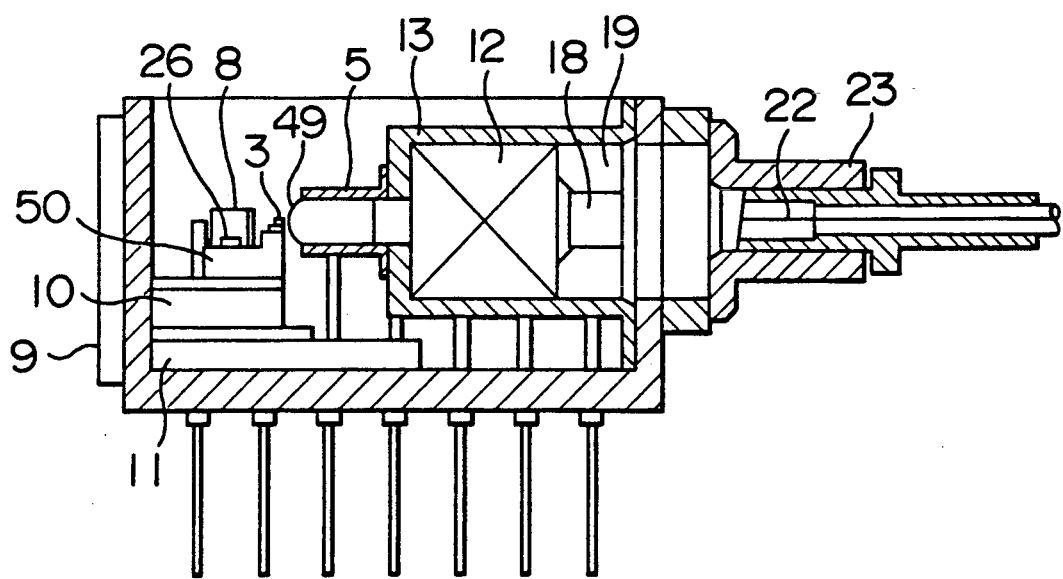
FIG. 20 is a side elevational view, showing partially in section, an optical coupling apparatus according to a further embodiment of the invention.

FIG. 20 is a side view showing in section an optical coupling apparatus according to a further embodiment of the invention. The lens holder 5 adapted to receive fixedly a first lens 49 is formed of an offset pipe having a reduced portion in which the first lens 49 constituted by a rod lens is inserted and bonded by using solder or sealing glass of a low melting point. On the other hand, inserted in an enlarged portion of the tubular lens holder 5 are an optical isolator 12 and a second lens 18 which is held by a second lens holder 19. One end portion of the lens holder 5 opposite to the end facing toward the light emitting diode is divided into at least four fingers which are welded to the opposite end surface of the case 9 by resistance welding or YAG-welding. Upon inserting of the lens and the optical isolator in the lens holder 5 formed of the pipe having the offset as mentioned above, the lens is first inserted in the lens holder 5 and bonded at the predetermined position, which is followed by insertion of the optical isolator and then insertion of the second lens in the lens holder. Next, the abutting ends of the second lens and the lens guide are bonded together by YAG welding. Subsequently, in the state where the light emitting diode 3 oscillates, the optical axis adjustment is performed between the light emitting diode 3 and the lens holder having the optical isolator and the second lens bonded thereto by grasping the tip of the lens holder and deforming plastically the end portion of the lens holder 5 at which the latter is welded to the end wall of the case 9, to thereby realize alignment of the optical axis. Additionally, the ferrule guide 23 is positionally aligned so that light can be coupled to the single-mode optical fiber 22 from the second lens 22 with high efficiency.

According to the embodiment of the invention described just above, any off-axis deviation taking place between the light emitting diode 3 and the optical fiber in the course of assembling can be corrected by adjusting the lens holder having the first lens inserted therein, whereby the coupling efficiency can be prevented from degradation to advantage.

Further, in the optical coupling apparatus of the structure described above, misalignment between the light beam emitted from the light emitting diode such as semiconductor laser and the optical axis of the optical isolator to which the light output of the light emitting diode is to be coupled after having been converged by the first lens can be canceled out through fine adjustment of deforming the first lens holder, whereby the optical coupling efficiency can be increased to further advantage. Besides, by virtue of such structure that the first lens is bonded to the optical isolator, the fine adjustment of the lens holder can be much facilitated with the procedure for adjustment being automated, to further advantage. Besides, by virtue of the first lens bonded to the optical isolator, deformation of the lens holder for the fine adjustment can easily be carried out, which can also be automated. Furthermore, since there is no necessity to mount the first lens on the chip carrier, the latter can be realized in a reduced size with advantage that the thermision element may be of a reduced capacity. It should also be mentioned that degradation of the optical coupling efficiency due to minute changes in the joints of the individual optical parts in the course of the use life after having been assembled can be remedied simply through fine adjustment of the first lens holder to advantage.

Figure 21:
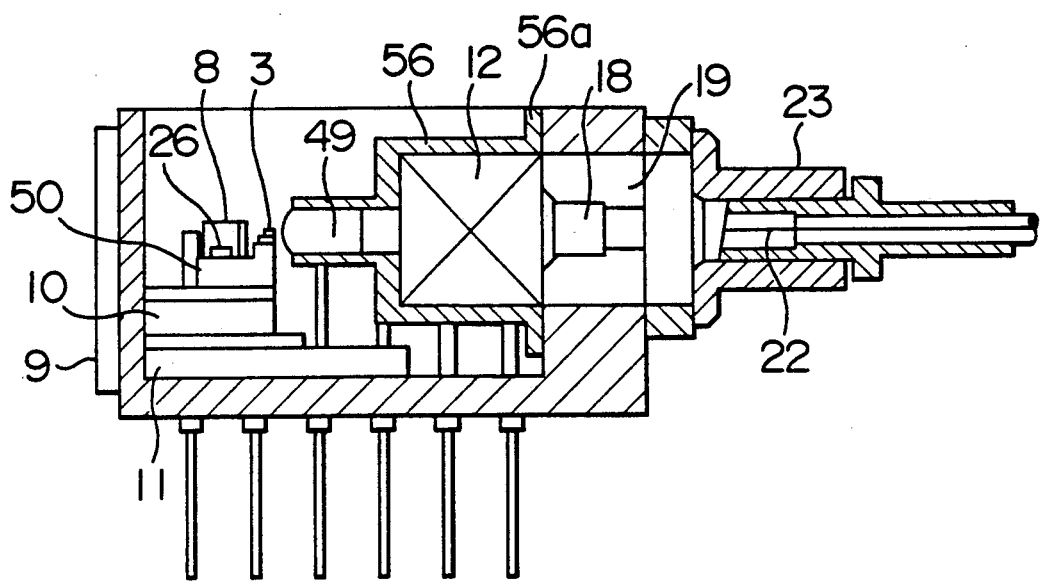
FIG. 21 is a side elevational view showing, partially in section, an optical coupling apparatus according to still further embodiment of the invention.
Figure 22:
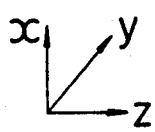
FIG. 22 is a side elevational view showing, partially in section, a structure of an optical coupling apparatus known heretofore.
Figure 22:
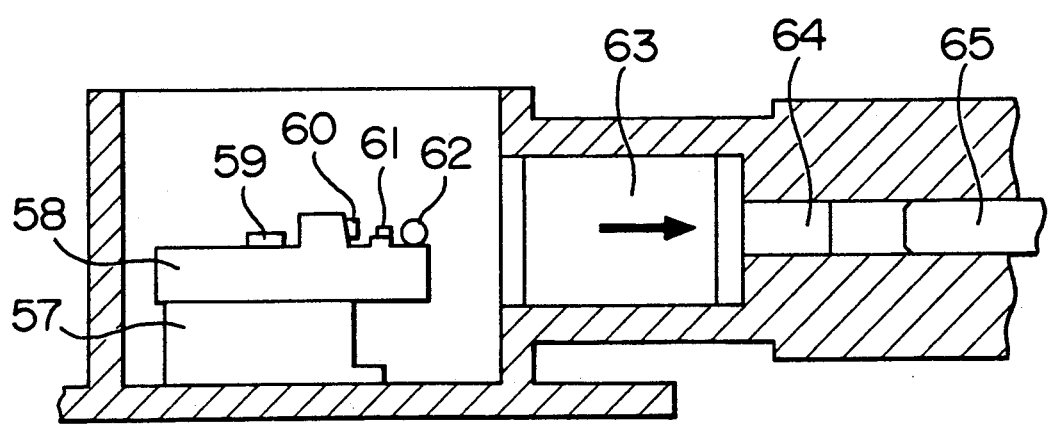

FIG. 21 is a side view showing partially in section the optical coupling apparatus according to a still further embodiment of the invention which is characterized in that the fine adjustment is not performed on the lens holder but on the optical isolator holder 56. Except this difference, the optical coupling apparatus is substantially same as that shown in FIG. 20.

Referring to FIG. 21, fingers 56a of the isolator holder 56 are welded spotwise to the inner wall of the case 9, wherein the fine adjustment is performed with reference to the stationary positions of the fingers 56a through the procedure similar to those performed for moving the lens holder in the preceding embodiments. In a version of the instant embodiment, the lens holder for the first lens may be provided separately from the optical isolator holder 56 so as to be adjustable individually.

As will now be appreciated from the foregoing, the present invention teaches that the positional relations among the optical parts are once determined roughly and then finely adjusted, in contrast to the prior art technique according to which the optical parts are positionally aligned and bonded once for all. Thus, according to the teachings of the invention disclosed herein, the aimed optical coupling can be realized with significantly improved accuracy.

What is claimed is:

1. A method of aligning an optical axis of an optical module comprising a plurality of optical parts including at least a first lens and a second lens and an optical isolator disposed on said optical axis interconnecting an optical coupling end of an optical fiber and a light emitting diode, said first lens being mounted in a first lens fixing pipe, said first lens, said second lens, and said optical isolator being mounted in a package, said method including the steps of:
   provisionally aligning the first lens with respect to said optical axis
   fixing the first lens to the package;
   and subsequently readjusting the first lens located remotely from said optical coupling end of the optical fiber by an adjustment of said fixing pipe.

2. An optical module comprising a light emitting diode, an optical element holder and an optical function element, said optical element holder being aligned to be on an optical axis between said light emitting diode and the optical function element, wherein said element holder further includes means for plastically deforming said optical element holder to be aligned to said optical axis.

* * * * *